(12) United States Patent
Sasaki et al.

(10) Patent No.: US 10,883,737 B2
(45) Date of Patent: Jan. 5, 2021

(54) VENTILATION CONTROL DEVICE

(71) Applicant: Panasonic Intellectual Property Management Co., Ltd., Osaka (JP)

(72) Inventors: Masayuki Sasaki, Aichi (JP); Naoyuki Funada, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 5 days.

(21) Appl. No.: 16/331,968

(22) PCT Filed: Sep. 21, 2017

(86) PCT No.: PCT/JP2017/034041
§ 371 (c)(1),
(2) Date: Mar. 9, 2019

(87) PCT Pub. No.: WO2018/061962
PCT Pub. Date: Apr. 5, 2018

(65) Prior Publication Data
US 2019/0219291 A1 Jul. 18, 2019

(30) Foreign Application Priority Data
Sep. 27, 2016 (JP) ................ 2016-187651

(51) Int. Cl.
*F24F 11/46* (2018.01)
*F24F 11/77* (2018.01)
(Continued)

(52) U.S. Cl.
CPC ............ *F24F 11/46* (2018.01); *F24F 7/06* (2013.01); *F24F 11/0001* (2013.01);
(Continued)

(58) Field of Classification Search
CPC .. F24F 11/46; F24F 11/77; F24F 11/61; F24F 11/0001; F24F 7/06; G05B 19/042; G05B 2219/2614
See application file for complete search history.

(56) References Cited

U.S. PATENT DOCUMENTS 5,115,728 A * 5/1992 Ahmed ................ B08B 15/023
454/340
2007/0155305 A1* 7/2007 Heidel ..................... F24F 7/06
454/356
(Continued)

FOREIGN PATENT DOCUMENTS

JP 2002-39578 A 2/2002

OTHER PUBLICATIONS

International Search Report for corresponding Application No. PCT/JP2017/034041, dated Nov. 14, 2017.

*Primary Examiner* — Thomas C Lee
*Assistant Examiner* — Gary Collins
(74) *Attorney, Agent, or Firm* — Renner, Otto, Boisselle & Sklar, LLP

(57) ABSTRACT

Provided is a ventilation control device (2) configured to control operation of one or more ventilators communicably connected thereto, the ventilation control device including: a target total exhaust volume storage unit (14) configured to store a target total exhaust volume that is a target total volume of exhaust to be discharged within a predetermined time; an exhaust capacity storage unit (13) configured to store the exhaust capacity of each of the one or more ventilators connected to the ventilation control device (2); an exhaust volume acquisition unit (17) configured to acquire an already-discharged exhaust volume discharged from each of the one or more ventilators connected to the ventilation control device (2); an integrating unit (18) configured to calculate a total already-discharged exhaust volume by adding up the already-discharged exhaust volumes of the one or more ventilators acquired by the exhaust volume acquisition unit; and an exhaust volume control unit (11) configured to, based on the total already-discharged exhaust volume calculated by the integrating unit (18), the target total exhaust volume stored in the target total exhaust
(Continued)

volume storage unit (14), a remaining time until the elapse of the predetermined time, and the exhaust capacity of each of the one or more ventilators stored in the exhaust capacity storage unit (13), control each of the one or more ventilators connected to the ventilation control device (2) to achieve exhaust in the target total exhaust volume within the remaining time.

8 Claims, 8 Drawing Sheets

(51) Int. Cl.
*G05B 19/042* (2006.01)
*F24F 11/61* (2018.01)
*F24F 11/00* (2018.01)
*F24F 7/06* (2006.01)
*F24F 7/00* (2006.01)

(52) U.S. Cl.
CPC .............. *F24F 11/61* (2018.01); *F24F 11/77* (2018.01); *G05B 19/042* (2013.01); *F24F 2007/001* (2013.01); *G05B 2219/2614* (2013.01)

(56) References Cited

U.S. PATENT DOCUMENTS

2015/0211749 A1* 7/2015 Robison .............. F24C 15/2021
                                                        454/340
2016/0252265 A1* 9/2016 Omura ................. F24F 11/0001
                                                        454/238

* cited by examiner

FIG. 7

| | Product information | | | Present information | | | |
|---|---|---|---|---|---|---|---|
| Product ID (main body) | Exhaust capacity | On-board sensor | Present airflow rate | Sensor state | Forced operation | Power consumption |
| FV15 | Rate 1: 50 cfm<br>Rate 2: 70 cfm<br>Rate 3: 90 cfm<br>Rate 4: 110 cfm<br>Rate 5: 130 cfm<br>Rate 6: 150 cfm | ·Human detection sensor<br>·Humidity sensor | 110cfm | Not-detected | No | 6.0w |

FIG. 8

| | Ventilation fan (exhaust capacity/W) | Range hood fan (exhaust capacity/W) | Pipe fan (exhaust capacity/W) | Total exhaust capacity (CFM) | Total power consumption (W) |
|---|---|---|---|---|---|
| Combination 62 | 50cfm/3W | 150cfm/15W | 30cfm/1W | 250CFM | 19W |
| Combination 63 | 70cfm/4W | 130cfm/11W | 30cfm/1W | 250CFM | 16W |
| Combination 64 | 90cfm/5W | 110cfm/9W | 30cfm/1W | 250CFM | 15W |
| ... | ... | ... | ... | 250CFM | ... |
| Combination 65 | 150cfm/8W | 50cfm/5W | 30cfm/1W | 250CFM | 14W |

VENTILATION CONTROL DEVICE

TECHNICAL FIELD

The present disclosure relates to a ventilation control device.

BACKGROUND ART

A conventional around-the-clock ventilation system according to the prior art includes a ventilator configured to ventilate at least a part of a building, and a controller configured to control the operation of the ventilator. In this around-the-clock ventilation system, the ventilator performs a ventilation operation, regardless of whether or not at least a part of the building is made use of (for example, see Patent Literature 1).

CITATION LIST

Patent Literature 1: Japanese Unexamined Patent Application Publication No. 2002-39578

SUMMARY OF INVENTION

However, the above-mentioned around-the-clock ventilation system provides energy-saving ventilation realizable only when any person is absent in a room, and therefore, energy-saving effects in the presence of a person in a room cannot be expected from the system. Moreover, the ventilation system is required to have a mechanism, such as a sensor, for detecting the absence of a person, and, in the intermittent operation control of the ventilator including the sensor, a detection state sometimes continues for a long time. In this case, the operation time of the ventilation system is rather too long, and accordingly it is difficult to achieve energy saving effects.

The present disclosure is conceived to solve the above-described problems, and an object of the present disclosure is to provide a ventilation control device capable of, while performing sufficient around-the-clock ventilation, easily providing energy-saving ventilation, regardless of whether a person is present or absent.

To solve the above-described problems, the ventilation control device according to the present disclosure is configured to control the operation of one or more ventilators communicably connected to the ventilation control device, the ventilation control device including: a target total exhaust volume storage unit configured to store a target total exhaust volume that is a target total volume of exhaust to be discharged within a predetermined time; an exhaust capacity storage unit configured to store an exhaust capacity of each of the one or more ventilators connected to the ventilation control device; an exhaust volume acquisition unit configured to acquire an already-discharged exhaust volume discharged from each of the one or more ventilators connected to the ventilation control device; an integrating unit configured to calculate a total already-discharged exhaust volume by adding up the already-discharged exhaust volumes of the one or more ventilators acquired by the exhaust volume acquisition unit; and an exhaust volume control unit configured to, based on the total already-discharged exhaust volume calculated by the integrating unit, the target total exhaust volume stored in the target total exhaust volume storage unit, a remaining time until the elapse of the predetermined time, and the exhaust capacity of each of the one or more ventilators, the capacity being stored in the exhaust capacity storage unit, control each of the one or more ventilators connected to the ventilation control device to achieve exhaust in the target total exhaust volume within the remaining time. Thus, the expected object is achieved.

According to the present disclosure, a minimum total volume of exhaust required to be discharged within the remaining time is calculated from the target total exhaust volume and the total already-discharged exhaust volume, and a ventilation fan is operated based on the minimum total exhaust volume, whereby the volume of ventilation for the entirety of a house can be minimized to a proper level, and thus, energy-saving effects can be achieved.

BRIEF DESCRIPTION OF DRAWINGS

FIG. 7 is a diagram illustrating an example of provided information on the ventilators according to the embodiment.

FIG. 8 is a diagram illustrating combinations of the ventilators selected by the ventilation control device according to the embodiment.

DESCRIPTION OF EMBODIMENTS

Figure 1:
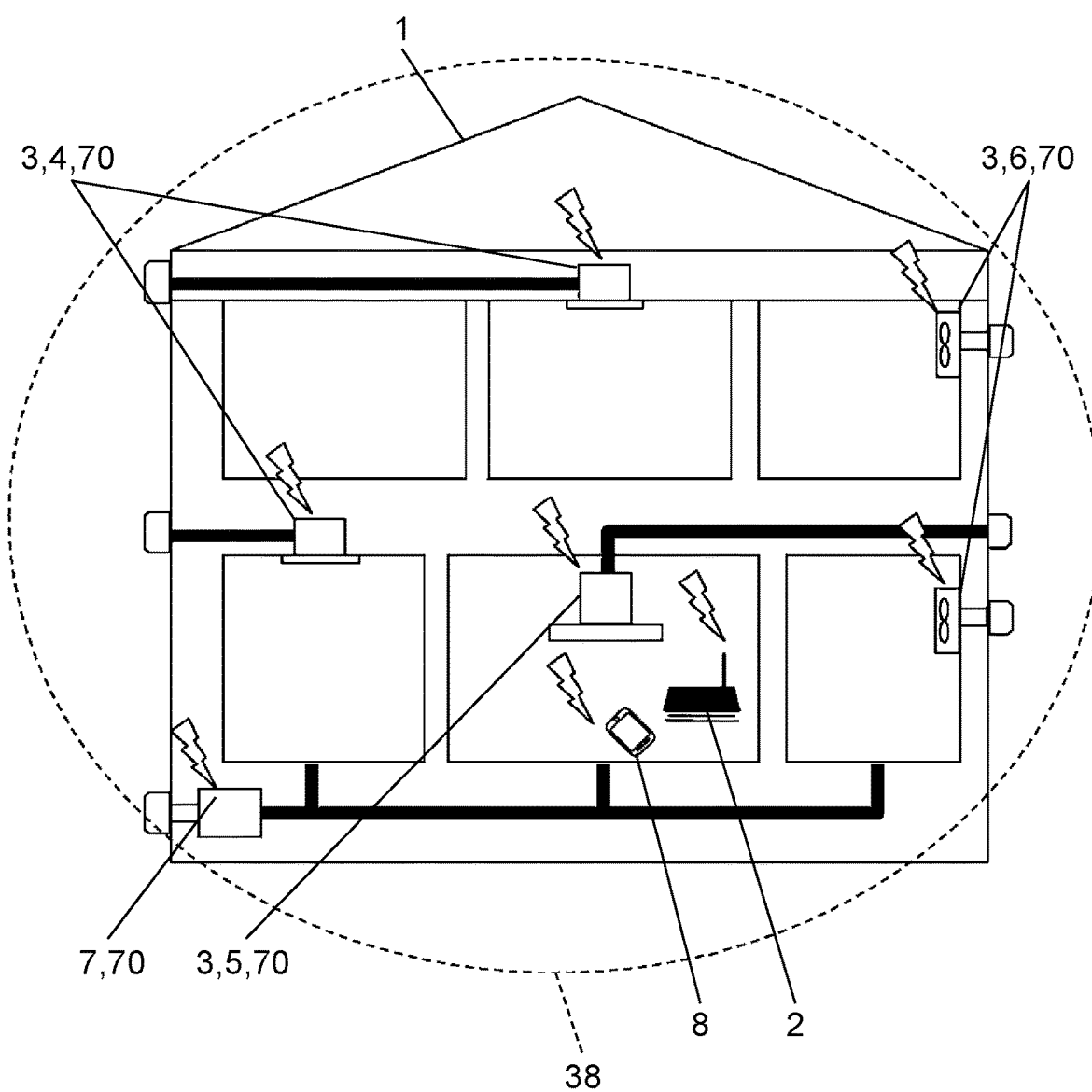
FIG. 1 is a schematic diagram of connection of an in-home network according to an embodiment.

Hereinafter, embodiments of the present disclosure will be described with reference to the drawings. Note that any of the embodiments described below represents a specific preferred example of the present disclosure. Therefore, numerical values, shapes, materials, constituents, arrangement positions and connection of the constituents, and steps and the order of the steps, each being described in the following embodiments, are merely exemplary and are not intended to limit the present disclosure. Hence, of the constituents in the following embodiments, constituents not set forth in independent claims which represent the most superordinate concept of the present disclosure are to be construed as optional constituents. Furthermore, in the drawings, substantially identical constituents are assigned the same reference signs, and overlapped descriptions thereof are omitted or simplified.

Embodiments

Figure 2:
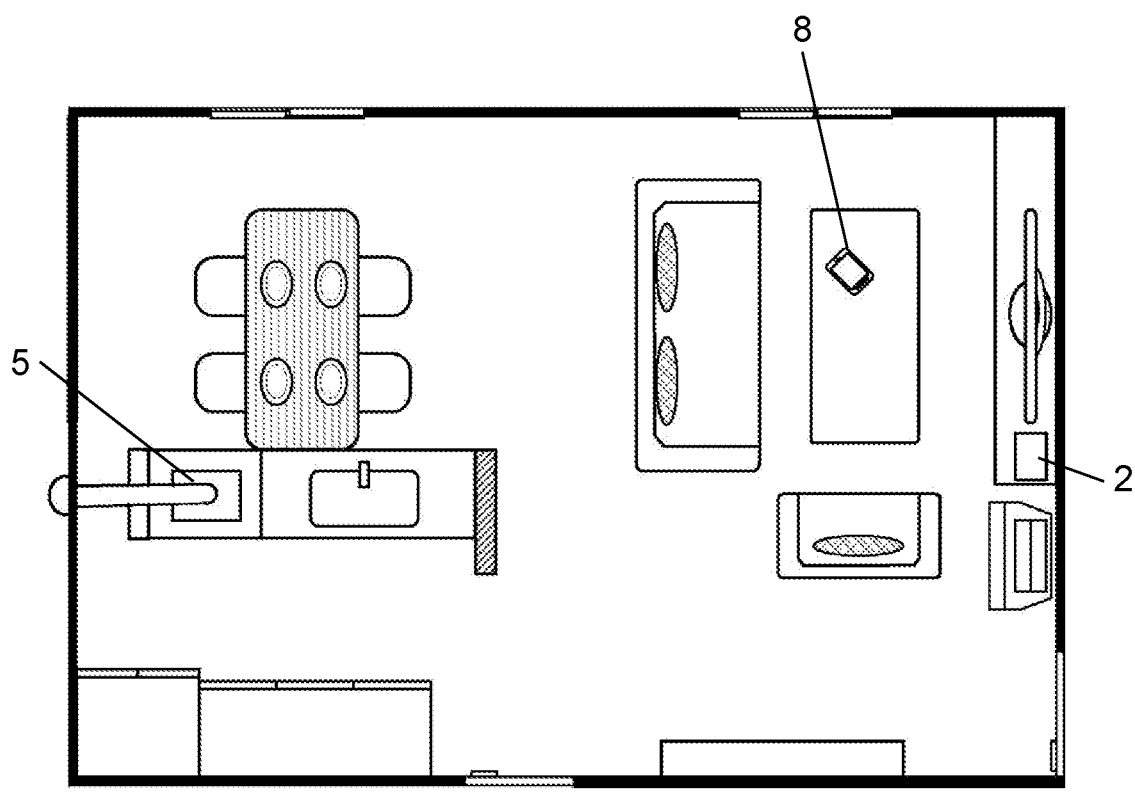
FIG. 2 is a schematic top view of an in-home space provided with a ventilation control device according to the embodiment.

First, the outline of a ventilation system according to the present disclosure will be described with reference to FIG. 1 and FIG. 2. Note that FIG. 1 is a schematic diagram of connection of an in-home network according to the present embodiment. FIG. 2 is a schematic top view of an in-home space provided with a ventilation control device according to the present embodiment.

[Ventilation System]

The ventilation system according to the present embodiment includes ventilation control device 2, exhausters 3, such as ceiling-embedded ventilation fan 4, wall-mounted ventilation fan 6, and range hood fan 5, configured to discharge air in a house to the outside, and air supply device 7 configured to introduce the outside air into the house.

Ventilation control device 2 is installed in ordinary house 1, and communicably connected to ceiling-embedded ventilation fan 4, wall-mounted ventilation fan 6, range hood fan 5, and air supply device 7, via in-home network 38. Ventilation control device 2 is communicably connected to an external server via an external network. Ventilation control device 2 is communicably connected to, for example, a plurality of ventilators 70 provided in the house and the external server, and the connection may be wired or wireless.

Examples of exhauster 3 include the above-mentioned ceiling-embedded ventilation fan 4, wall-mounted ventilation fan 6, range hood fan 5, and a heat exchange ventilation fan (not illustrated). In other words, exhauster 3 is a device having an exhaust function of carrying out exhaust from the inside to the outside of ordinary house 1.

Examples of air supply device 7 include an air supply function of a heat exchange ventilation fan and an air supply fan. In other words, air supply device 7 is a device having an air supply function of supplying air from the outside to the inside of ordinary house 1. Note that air supply device 7 does not necessarily have a fan, and is only required to include, for example, an air duct communicating with the inside and outside of the house, and an opening-and-closing section for opening and closing the air duct, and to be capable of electrically opening and closing the opening-and-closing section.

Examples of ventilator 70 include exhauster 3 and air supply device 7. In other words, ventilator 70 is a device having at least any one of an air supply function and an exhaust function.

Information input terminal 8 is communicably connected to ventilation control device 2 via in-home network 38 or an external network. Information input terminal 8 is configured to cause ventilation control device 2 to store information necessary for constituting the ventilation system of the present embodiment. Examples of information input terminal 8 include devices, such as a mobile phone, a smartphone, and a tablet.

Figure 3:
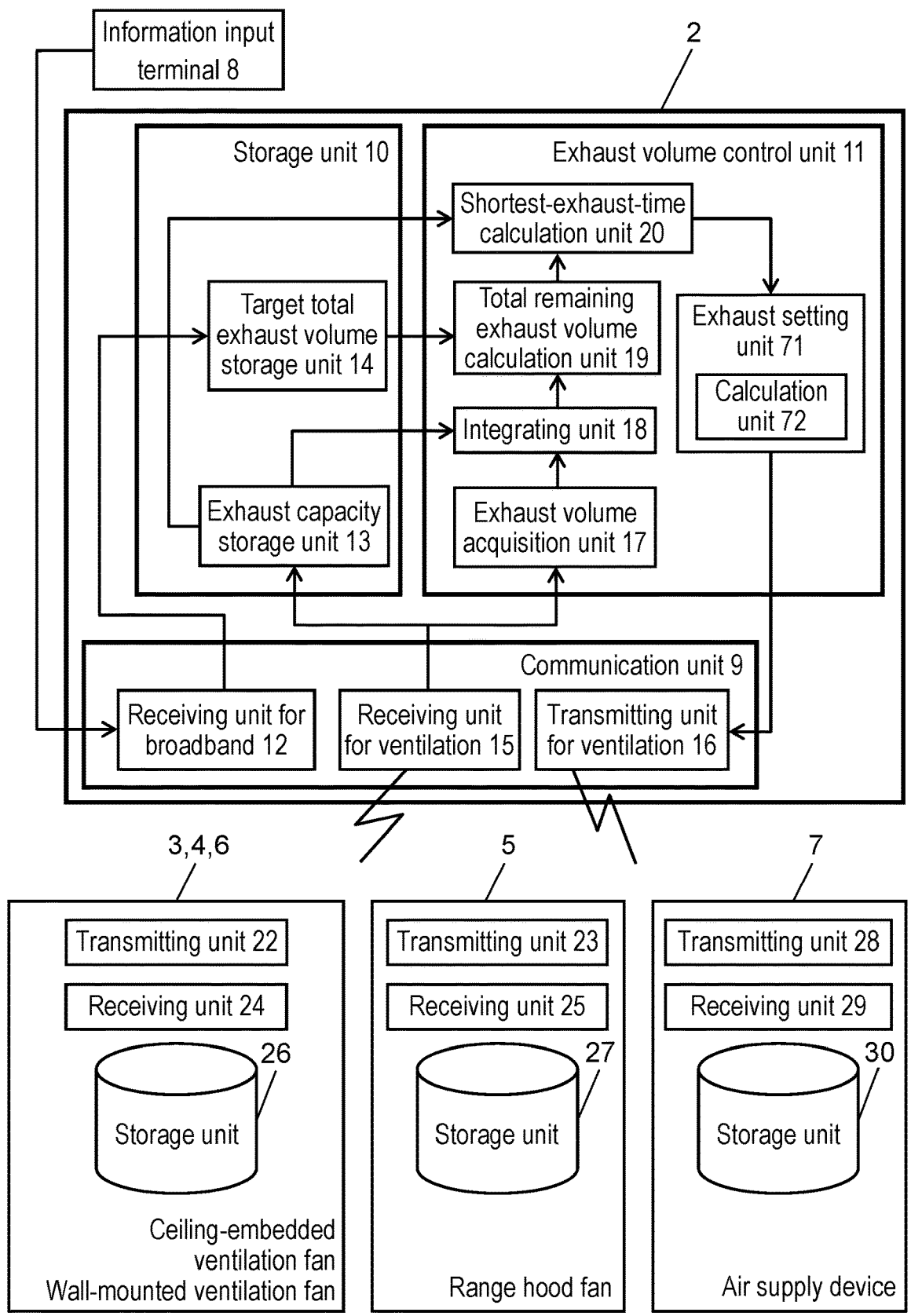
FIG. 3 is a schematic functional block diagram of the ventilation control device and the ventilators according to the embodiment.
Figure 4:
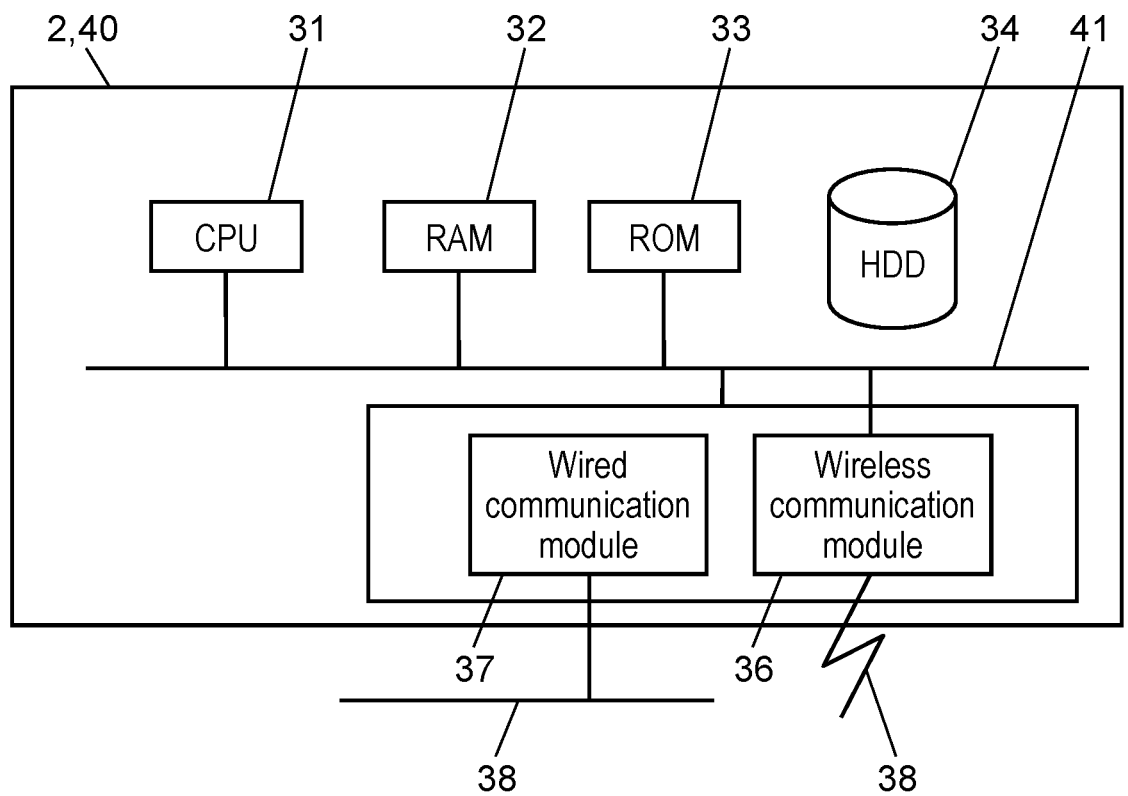
FIG. 4 is a configuration diagram of the ventilation control device according to the embodiment.
Figure 5:
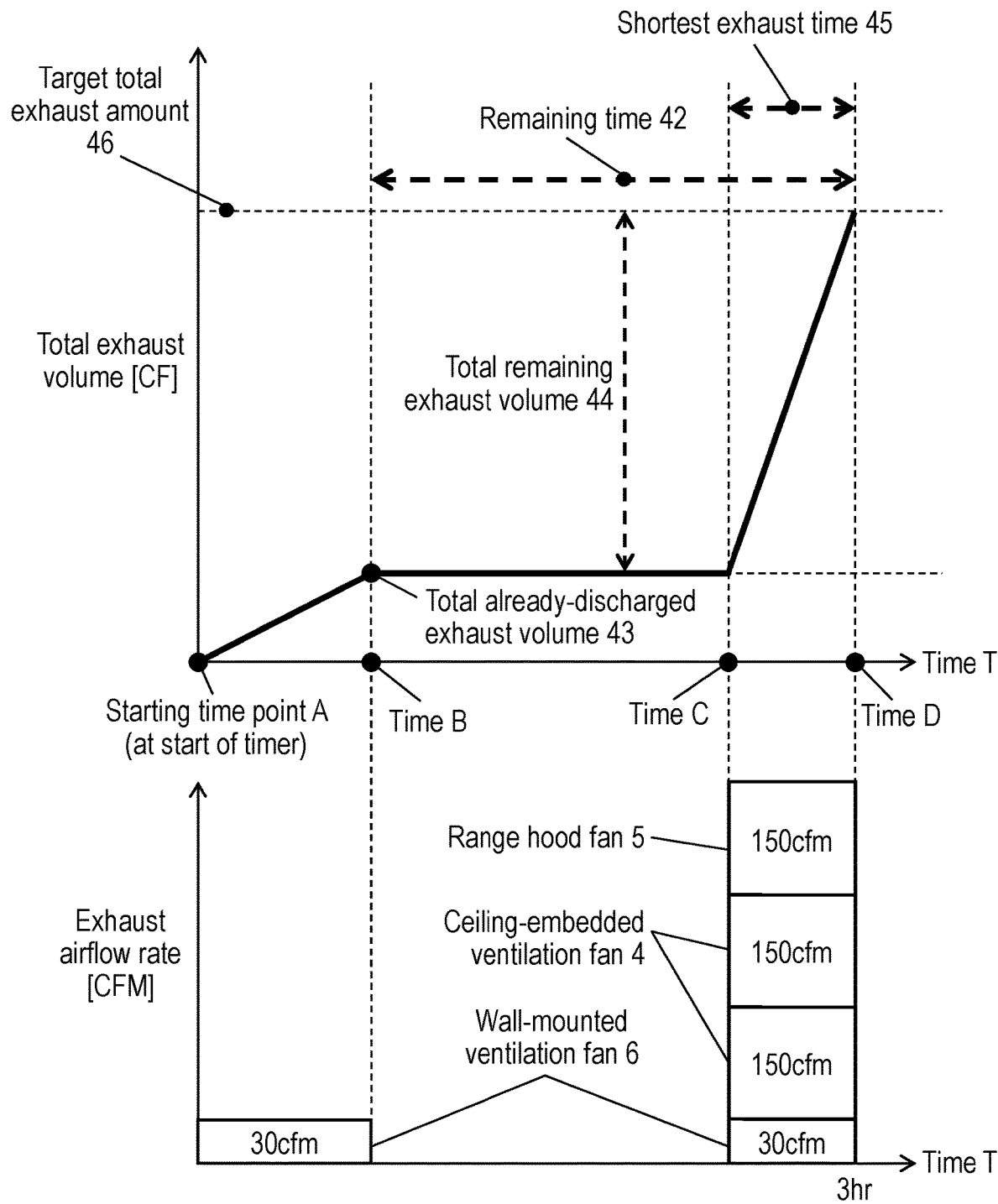
FIG. 5 is a graph illustrating an operation example of the ventilators controlled by the ventilation control device according to the embodiment.

Next, functional units that constitute ventilation control device 2, ceiling-embedded ventilation fan 4, wall-mounted ventilation fan 6, range hood fan 5, and air supply device 7 will be described with reference to FIG. 3, FIG. 4, and FIG. 5. Note that FIG. 3 is a schematic functional block diagram of the ventilation control device and the ventilators according to the present embodiment. FIG. 4 is a configuration diagram of the ventilation control device according to the present embodiment. FIG. 5 is a graph illustrating an operation example of the ventilators controlled by the ventilation control device according to the present embodiment.

[Ventilation Control Device]

As illustrated in FIG. 3, ventilation control device 2 includes communication unit 9, storage unit 10, and exhaust volume control unit 11.

Communication unit 9 includes: receiving unit for broadband 12 communicably connected to information input terminal 8 and an external server; receiving unit for ventilation 15 configured to receive a radio signal from each of ventilators 70; and transmitting unit for ventilation 16 configured to wirelessly give operation instructions to each of ventilators 70.

Receiving unit for ventilation 15 receives radio signals transmitted from transmitting units 22 of ceiling-embedded ventilation fan 4 and wall-mounted ventilation fan 6, transmitting unit 23 of range hood fan 5, and transmitting unit 28 of air supply device 7.

Transmitting unit for ventilation 16 transmits radio signals, the radio signals indicating operations on which exhaust volume control unit 11 instructs the ventilators, to receiving units 24 of ceiling-embedded ventilation fan 4 and wall-mounted ventilation fan 6, receiving unit 25 of range hood fan 5, and receiving unit 29 of air supply device 7.

Storage unit 10 includes target total exhaust volume storage unit 14 and exhaust capacity storage unit 13, and is capable of reading information used for processing by exhaust volume control unit 11, as necessary.

Via communication unit 9 such as receiving unit for broadband 12 or in-home network 38, target total exhaust volume storage unit 14 acquires a target total exhaust volume for a house, the volume having been inputted to information input terminal 8. In other words, for example, a user sets a target total exhaust volume for a house by making use of information input terminal 8, so that the target total exhaust volume set by the user is stored in target total exhaust volume storage unit 14. As a matter of course, the target total exhaust volume varies depending on, for example, the size of a house, the number of rooms thereof, the airtightness thereof, and the thermal insulating properties thereof. Hence, different values of the target total exhaust volume are set for different houses. The target total exhaust volume is a total volume of exhaust that should be discharged from a predetermined house within a predetermined time. The predetermined time used herein is, for example, one day (24 hours) or 3 hours, and thus varies depending on environments and agreements. Therefore, in the present embodiment, the predetermined time is a time that a user can arbitrarily set in accordance with laws and regulations, such as environmental standards and ventilation standards for a house in which ventilators 70 are installed, or environmental conditions specific to the house, and here, the predetermined time is 3 hours as an example.

Exhaust capacity storage unit 13 stores the exhaust capacity of at least one exhauster 3 connected to ventilation control device 2. Examples of the exhaust capacity include the maximum exhaust volume per unit time of exhauster 3. Furthermore, in the case where the exhaust capacity (exhaust setting) of exhauster 3 can be set at a plurality of levels, an exhaust capacity setting and an exhaust volume per unit time at the time of making this setting may correspond to each other and be stored as an exhaust capacity. Examples of the exhaust capacity setting include Rate 1, Rate 2, Weak, Medium, and Strong. The exhaust capacity may be inputted from, for example, information input terminal 8, or may be acquired by an inquiry sent from exhaust volume control unit 11 to newly connected exhauster 3, and stored in exhaust capacity storage unit 13. For the purpose of balancing between an exhaust volume and an air supply volume as described later, exhaust capacity storage unit 13 may also store the air supply capacity of air supply device 7 as well as the exhaust capacity.

Exhaust volume control unit 11 includes exhaust volume acquisition unit 17, integrating unit 18, total remaining exhaust volume calculation unit 19, shortest-exhaust-time calculation unit 20, exhaust setting unit 71, and calculation unit 72.

Exhaust volume acquisition unit 17 acquires an already-discharged exhaust volume, that is, the volume of exhaust having been already discharged from each of exhausters 3 connected to ventilation control device 2. Here, the already-discharged exhaust volume is acquired in the following manner, for example.

That is, at a timing when exhauster 3 starts exhaust, exhaust volume acquisition unit 17 receives an exhaust volume per unit time from exhauster 3 via communication unit 9. Furthermore, at a timing when exhauster 3 changes an exhaust volume setting, exhaust volume acquisition unit 17 receives the changed exhaust volume per unit time from exhauster 3 via communication unit 9. Furthermore, at a timing when exhauster 3 stops exhaust, exhaust volume acquisition unit 17 receives a notification about the stop from exhauster 3 via communication unit 9. When receiving the data above, exhaust volume acquisition unit 17 multiplies the exhaust volume per unit time by a time period of operation with the exhaust volume to acquire a volume of exhaust having been already discharged by exhauster 3.

As another method, exhaust volume acquisition unit 17 may send an inquiry about an already-discharged exhaust volume to each of exhausters 3 via communication unit 9 at predetermined time intervals. In response to this inquiry, each of exhausters 3 replies to the inquiry sent from exhaust volume acquisition unit 17, via communication unit 9, with the volume of exhaust having been already discharged between the previous inquiry and this inquiry.

When the above-described processing is performed for each of exhausters 3 connected to ventilation control device 2, exhaust volume acquisition unit 17 can acquire the volume of exhaust having been already discharged from each of exhausters 3.

Integrating unit 18 acquires, at predetermined time intervals, all the already-discharged exhaust volumes acquired by exhaust volume acquisition unit 17, and adds up the volumes, in other words, integrates the volumes. Thus, total already-discharged exhaust volume 43 (see FIG. 5) discharged from a house via all of exhausters 3 connected to ventilation control device 2 can be calculated.

Total remaining exhaust volume calculation unit 19 subtracts the total already-discharged exhaust volume calculated by integrating unit 18 from a target total exhaust volume per predetermined time that is stored in target total exhaust volume storage unit 14, whereby total remaining exhaust volume 44 (see FIG. 5), that is, a total exhaust volume short of the target total exhaust volume is calculated. Here, the calculation of total remaining exhaust volume 44 by total remaining exhaust volume calculation unit 19 is performed at a timing earlier than the elapse of the predetermined time set for the target total exhaust volume, as a matter of course.

Shortest-exhaust-time calculation unit 20 calculates shortest exhaust time 45 (see FIG. 5), that is, a time required for achieving the target total exhaust volume when exhaust is performed with the maximum exhaust capacities of all of exhausters 3 connected to ventilation control device 2, the capacities having been stored in exhaust capacity storage unit 13.

Using the predetermined time required for achieving target total exhaust volume 46 (see FIG. 5) and time B (see FIG. 5) at which total already-discharged exhaust volume 43 is calculated, exhaust setting unit 71 calculates remaining time 42 (see FIG. 5), that is, a remaining time until the elapse of the predetermined time set for achieving target total exhaust volume 46. As illustrated in FIG. 5, remaining time 42 is calculated by subtracting the time elapsed from starting time point A to time B from time D serving as the predetermined time. Remaining time 42 is a time left to achieve target total exhaust volume 46. Total remaining exhaust volume 44, that is, a total exhaust volume short of target total exhaust volume 46 is calculated by total remaining exhaust volume calculation unit 19. Thus, based on remaining time 42 and total remaining exhaust volume 44, ventilation control device 2 can determine, for example, how much average exhaust volume is required for operating exhausters 3 during remaining time 42. Note that, details about how to operate exhausters 3 during remaining time 42 will be described later, but, for example, there may be employed a control pattern in which all of exhausters 3 are operated at the maximum exhaust airflow rate until the remaining exhaust volume of air is discharged. This allows target total exhaust volume 46 to be achieved in the shortest time. As a matter of course, if there are no other restrictions, exhausters 3 are operated during remaining time 42 preferably with high energy efficiency, that is, with reduced energy. In this case, calculation unit 72 makes a calculation to determine an optimal control pattern of each of ventilators 70, based on the energy consumption and exhaust airflow rate of each of ventilators 70. When the control pattern is determined, exhaust setting unit 71 transmits an operation command to each of ventilators 70 via transmitting unit for ventilation 16 to control each of ventilators 70.

Note that coordinated operations between units will be described later using a flowchart.

As illustrated in FIG. 4, ventilation control device 2 is provided as microcomputer 40. Microcomputer 40 includes central processing unit (CPU) 31, random access memory (RAM) 32, and read only memory (ROM) 33 inside the microcomputer 40, and further includes hard disk drive (HDD) 34 as storage unit 10. Microcomputer 40 further includes wired communication module 37 and wireless communication module 36. Wired communication module 37 and wireless communication module 36 each function as communication unit 9, and are connected to CPU 31, RAM 32, ROM 33, and HDD 34 via internal bus 41. For example, CPU 31 makes use of RAM 32 as a workspace, executes a program stored in ROM 33, and transmits and receives data and commands to/from storage unit 10 and devices, based on the result of the program execution, thereby controlling the operation of the devices.

Exhaust volume control unit 11 and the units belonging to exhaust volume control unit 11 function as programs stored in ROM 33, and execute predetermined processing when executed by CPU 31. HDD 34, ROM 33, and RAM 32 are not necessarily required to be used, and other types of memories may be used instead.

Devices such as wireless communication module 36 and wired communication module 37 are not necessarily provided in microcomputer 40, and may be externally connected.

[Exhauster and Air Supply Device]

Ceiling-embedded ventilation fan 4 and wall-mounted ventilation fan 6, which are examples of exhauster 3, each include transmitting unit 22, receiving unit 24, and storage unit 26. Range hood fan 5 includes transmitting unit 23, receiving unit 25, and storage unit 27. Air supply device 7 includes transmitting unit 28, receiving unit 29, and storage unit 30.

Transmitting unit 22 of ceiling-embedded ventilation fan 4 reads, from storage unit 26, information to be provided, and transmits the information to ventilation control device 2 via in-home network 38 by wireless communication.

Storage unit 26 stores information to be provided, the information being possibly required from ventilation control device 2. Examples of the provided information that storage unit 26 stores include, but are not limited to, an operation state indicating whether or not ceiling-embedded ventilation fan 4 is in operation, an exhaust volume setting (for example, weak, medium, strong) of ceiling-embedded ventilation fan 4 in operation, and an exhaust airflow volume per unit time that corresponds to the exhaust volume setting.

Note that not only ceiling-embedded ventilation fan 4, but also wall-mounted ventilation fan 6, range hood fan 5, air supply device 7, and other various exhausters and air supply devices, each being connected to ventilation control device 2 to carry out a function, basically have the above-mentioned configuration.

[In-Home Network]

In-home network 38 configured to connect ventilation control device 2, exhauster 3, and air supply device 7 is, for example, digital enhanced cordless telecommunications or wireless communications using a Wi-FI (registered trademark) system.

Figure 6:
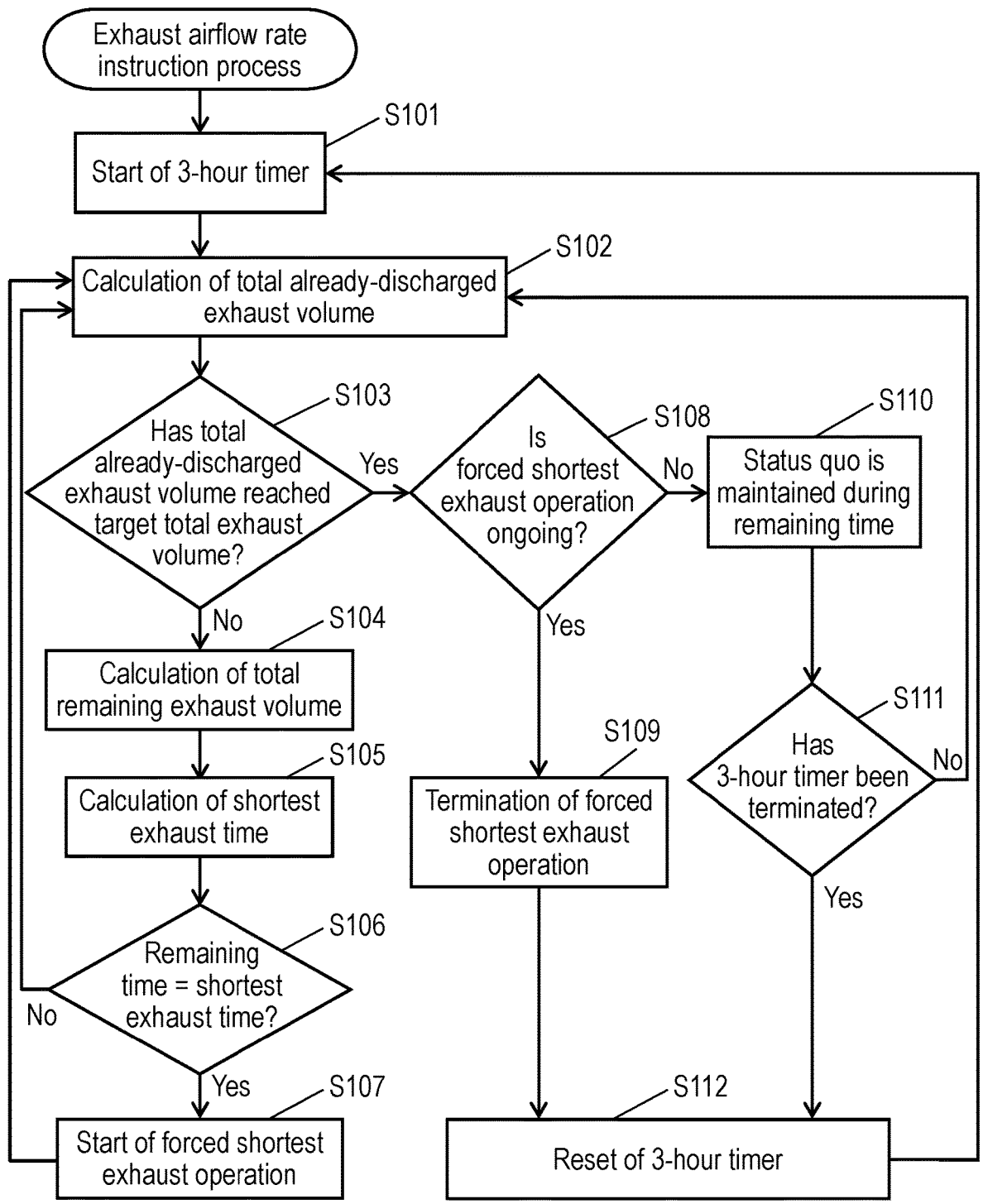
FIG. 6 is a flowchart illustrating information processing by the ventilation control device according to the embodiment.

Next, the operations of ventilation control device 2 will be described with reference to FIG. 3, FIG. 5, and FIG. 6. Note that FIG. 5 is a graph illustrating an operation example of the ventilators controlled by the ventilation control device according to the present embodiment. FIG. 6 is a flowchart illustrating information processing by the ventilation control device according to the present embodiment. In FIG. 6, S represents a step. Note that steps are not necessarily implemented in ascending order of number.

Ventilation control device 2 is configured such that target total exhaust volume 46 set beforehand by information input terminal 8 and predetermined time D (corresponding to the predetermined time, namely, 3 hours in the present embodiment) to achieve target total exhaust volume 46 are stored in storage unit 10.

Ventilation control device 2 starts a timer at starting time point A to start the control of exhaust airflow rate (S101). Time D is a time point at which 3 hours have been elapsed from starting time point A. After the timer reaches time D, the timer is reset, and started again from 0. These operations are repeated as a routine work as long as there is no change in the setting of time D.

Here, it is assumed that, in accordance with user's intention, wall-mounted ventilation fan 6 is operated at an exhaust airflow rate of 30 cfm from starting time point A, that is, a time for starting the timer, until time B, and stopped at time B. In this case, the time and exhaust airflow rate (30 cfm) at starting time point A and the time and exhaust airflow rate (0 cfm) at time B are transmitted, at the respective timings of starting time point A and time B, from transmitting unit 22 to exhaust volume acquisition unit 17 via receiving unit for ventilation 15.

Based on the transmitted information, exhaust volume acquisition unit 17 calculates the volume of exhaust already discharged between starting time point A and time B, and transmits the calculation result to integrating unit 18. The calculation is performed at predetermined time intervals (for example, at one-second intervals), assuming that the operation goes on under the already-given condition (the exhaust airflow rate (30 cfm)) also between starting time point A and time B inclusive during which information from ventilator 70 has not been given.

Integrating unit 18 calculates total already-discharged exhaust volume 43 by adding up the already-discharged exhaust volumes acquired by exhaust volume acquisition unit 17 (S102). Here, only wall-mounted ventilation fan 6 is operated, which means that the already-discharged exhaust volume of wall-mounted ventilation fan 6 is equal to total already-discharged exhaust volume 43.

Note that exhaust volume control unit 11 always monitors whether or not total already-discharged exhaust volume 43 has reached target total exhaust volume 46 (S103).

Here, in the case where total already-discharged exhaust volume 43 has not reached target total exhaust volume 46, total remaining exhaust volume calculation unit 19 calculates total remaining exhaust volume 44 from the difference between total already-discharged exhaust volume 43 and target total exhaust volume 46 (No at S103 S104). Shortest-exhaust-time calculation unit 20 calculates shortest exhaust time 45 necessary for exhaust in total remaining exhaust volume 44 with the maximum exhaust capacities of exhausters 3 connected to ventilation control device 2 (S105). Note that the maximum exhaust capacity of ceiling-embedded ventilation fan 4 is 150 cfm, the maximum exhaust capacity of wall-mounted ventilation fan 6 is 30 cfm, and the maximum exhaust capacity of range hood fan 5 is 150 cfm.

Subsequently, exhaust setting unit 71 compares shortest exhaust time 45 with remaining time 42 until time D (S106). Here, at the point of time B, in the case where remaining time 42 is sufficiently longer than shortest exhaust time 45, exhaust setting unit 71 determines to maintain the present exhaust capacity (No at S106→S102).

Subsequently, it is assumed that, while a user has not operated ventilators 70, the time reaches time C at which remaining time 42 becomes equal to shortest exhaust time 45. In this case, exhaust setting unit 71 instructs, via transmitting unit for ventilation 16, each of exhausters 3 to forcibly start an exhaust operation at the maximum exhaust airflow rate (forced shortest-exhaust operation) (Yes at S106→S107).

Here, in the above-described processing, the comparison between shortest exhaust time 45 and remaining time 42 is performed to determine whether to start the forced shortest-exhaust operation (S106), but, for example, a comparison between total remaining exhaust volume 44 and the maximum exhaustible total volume (not illustrated) obtained by multiplying the maximum exhaust capacities of exhausters 3 by remaining time 42 may be performed. In this case, when the maximum exhaustible total volume is larger than total remaining exhaust volume 44, the status quo is maintained. In contrast, when the maximum exhaustible total volume is equivalent to or smaller than total remaining exhaust volume 44, the forced shortest-exhaust operation is started to achieve the same effect.

In accordance with the above-described instruction, ceiling-embedded ventilation fan 4, wall-mounted ventilation fan 6, and range hood fan 5 start an operation at time C at the maximum exhaust airflow rate, namely, at 150 cfm, 30 cfm, and 150 cfm, respectively. With this operation, target total exhaust volume 46 is achieved at time D (repetition of S107→S102→S103).

After that, when the timer reaches time D and total remaining exhaust volume 44 and remaining time 42 become 0, whereby it is determined that target total exhaust volume 46 has been achieved, then exhaust setting unit 71 stops the forced shortest-exhaust-operation, and at the same time, resets the timer and the total already-discharged exhaust volume at 0 (S103→S108→S109→S112).

In FIG. 6, the forced shortest-exhaust-operation is performed between time C and time D, that is, in the last part of the remaining time 42 of the predetermined 3 hours. However, there can be assumed a case in which, in accordance with user's intention, any one or a plurality of exhausters 3 operates between time B and time C, so that target total exhaust volume 46 is achieved before the forced shortest-exhaust-operation is performed. In this case, exhaust setting unit 71 instructs exhausters 3 not to perform the forced shortest-exhaust-operation, but to maintain the status quo (S108→S110). Then, at the time when 3 hours have elapsed, the timer and total already-discharged exhaust volume 43 are reset at 0 (Yes at S111→S112).

The above-described processing allows ventilation control device 2 according to the present embodiment to control the operation of exhausters 3 so as to achieve target total exhaust volume 46 within the predetermined time. Furthermore, when a total exhaust volume owing to the operation of all of connected exhausters 3 for the predetermined 3 hours is counted and the total exhaust volume is controlled so as not to considerably exceed target total exhaust volume 46, then energy saving effects can be achieved.

When air supply device 7 receives, from ventilation control device 2 via receiving unit 29, information on the total volume of exhaust from exhausters 3 (ceiling-embedded ventilation fan 4, wall-mounted ventilation fan 6, and range hood fan 5), air supply device 7 operates to supply air in an air supply volume equivalent to the total exhaust volume to a house. This operation of air supply device 7 aims to attain a balance between an exhaust volume and an air supply volume, and offers the effect of preventing an extremely negative pressure from being caused in a house.

FIG. 7 is a diagram illustrating provided information on the ventilator according to the present embodiment. In the present embodiment, examples of provided information 47 dealt in storage unit 26, storage unit 27, and storage unit 30 of the above-described ventilators 70, such as ceiling-embedded ventilation fan 4 and wall-mounted ventilation fan 6, are operation states and exhaust airflow rates. However, as illustrated in FIG. 7, product information 58 specific to ventilator 70 and present information 59 on ventilator 70 may be configured to be transmitted as provided information 47 to ventilation control device 2. Here, product information 58 includes, for example, product ID 51, exhaust capacity 52 of ventilator 70 indicating settable airflow rates, and on-board sensor 53 indicating the type of a sensor installed into ventilator 70. Present information 59 include, for example, present airflow rate 54 indicating a present operation state, sensor state 55 indicating a detection state of the on-board sensor, forced operation 56 indicating whether or not a user forcibly operates the ventilator, and power consumption 57 indicating power consumption at the present airflow rate. Based on product information 58 specific to ventilators 70 and present information 59 thereof, calculation unit 72 can grasp, for example, electrical characteristics of each of connected ventilators 70, and select a combination of ventilators 70 that achieves the minimum power consumption. Thus, ventilation control device 2 can not only achieve target total exhaust volume 46, but also realize exhaust control to reduce power consumption.

FIG. 8 is a diagram illustrating combinations of the ventilators, the combinations being selected by the ventilation control device according to the present embodiment. FIG. 8 illustrates combinations of ventilators 70 in the case where an exhaust airflow rate necessary in a house for a predetermined time is set at 250 cfm. In this case, using information on the airflow rates and power consumption of ventilators 70, calculation unit 72 selects optimal combination 65 that achieves the minimum power consumption, so that ventilators 70 can be controlled.

INDUSTRIAL APPLICABILITY

As described above, the ventilation control device according to the present disclosure can conduct processing for determining ventilators connected to the ventilation control device and conditions for the most efficient and shortest driving of the ventilators in accordance with the state of usage of the ventilators, and hence, the ventilation control device are applicable to, for example, stand-alone houses and multifamily dwelling houses such as apartments.

REFERENCE MARKS IN THE DRAWINGS

1 . . . ordinary house
2 . . . ventilation control device
3 . . . exhauster
4 . . . ceiling-embedded ventilation fan
5 . . . range hood fan
6 . . . wall-mounted ventilation fan
7 . . . air supply device
8 . . . information input terminal
9 . . . communication unit
10, 26, 27, 30 . . . storage unit
11 . . . exhaust volume control unit
12 . . . receiving unit for broadband
13 . . . exhaust capacity storage unit
14 . . . target total exhaust volume storage unit
15 . . . receiving unit for ventilation
16 . . . transmitting unit for ventilation
17 . . . exhaust volume acquisition unit
18 . . . integrating unit
19 . . . total remaining exhaust volume calculation unit
20 . . . shortest-exhaust-time calculation unit
22, 23, 28 . . . transmitting unit
24, 25, 29 . . . receiving unit
31 . . . CPU
32 . . . RAM
33 . . . ROM
34 . . . HDD
36 . . . wireless communication module
37 . . . wired communication module
38 . . . in-home network
40 . . . microcomputer
41 . . . internal bus
42 . . . remaining time
43 . . . total already-discharged exhaust volume
44 . . . total remaining exhaust volume
45 . . . shortest exhaust time
46 . . . target total exhaust volume
47 . . . provided information
51 . . . product ID
52 . . . exhaust capacity
53 . . . onboard sensor
54 . . . present airflow rate
55 . . . sensor state
56 . . . forced operation
57 . . . power consumption
58 . . . product information
59 . . . present information
65 . . . combination
70 . . . ventilator
71 . . . exhaust setting unit
72 . . . calculation unit

The invention claimed is:
1. A ventilation control device configured to control operation of one or more ventilators communicably connected to the ventilation control device, the ventilation control device comprising a processor and memory configured to:

store a target total exhaust volume that is a target total volume of exhaust to be discharged within a predetermined time;

store an exhaust capacity of each of the one of more ventilators connected to the ventilation control device;

acquire an already-discharged exhaust volume discharged from each of the one or more ventilators connected to the ventilation control device;

calculate a total already-discharged exhaust volume by adding up the already-discharged exhaust volumes of the one or more ventilators; and to, based on the calculated total already-discharged exhaust volume, the stored target total exhaust volume, a remaining time until an elapse of the predetermined time, and the stored exhaust capacity of each of the one or more ventilators, control each of the one or more ventilators connected to the ventilation control device to achieve exhaust in the target total exhaust volume within the remaining time, wherein the processor and the memory are configured to:

calculate a shortest exhaust time required for achieving the target total exhaust volume at the exhaust capacity;

calculate a total remaining exhaust volume that is a total exhaust volume required to reach the target total exhaust volume, based on the target total exhaust volume and the calculated total already-discharged exhaust volume at a timing at least the shortest exhaust time earlier than a time reaching the predetermined time, and set a turn-on time for each of the one or more ventilators connected to the ventilation control device, based on the calculated total remaining exhaust volume, the turn-on time being a time length in which the ventilator is operated, and wherein, when the total already-discharged exhaust volume exceeds the target total exhaust amount within the predetermined time, the processor stops exhaust of the one or more ventilators or prohibits the one or more ventilators from operating.

2. The ventilation control device according to claim 1, wherein each of the one or more ventilators include two or more levels of the exhaust capacity, and the processor sets one of the two or more levels of the exhaust capacity.

3. The ventilation control device according to claim 1, wherein the ventilation control device achieves exhaust in the target total exhaust volume at a maximum of the exhaust capacity within the remaining time.

4. The ventilation control device according to claim 1, wherein the processor calculates a control pattern for the one or more ventilators based on (i) the remaining time and (ii) an energy efficiency per unit time and an exhaust volume corresponding to the energy efficiency of each of the one or more ventilators, the control pattern achieving exhaust in the target total exhaust volume within the remaining time and maximizing the energy efficiency, and the processor controls at least one of the one or more ventilators connected to the ventilation control device, based on the calculated control pattern.

5. The ventilation control device according to claim 1, wherein at least one of the one or more ventilators has an exhaust function.

6. The ventilation control device according to claim 5, wherein the at least one of the one or more ventilators having the exhaust function includes a range hood fan, a ventilation fan, and a heat exchange ventilation fan.

7. The ventilation control device according to claim 1, wherein the one or more ventilators includes an air supply fan having an air supply function, and the processor operates the air supply fan when at least one ventilator other than the air supply fan among the one or more ventilators carries out an exhaust operation.

8. A ventilation control device configured to control operation of one or more ventilators communicably connected to the ventilation control device, the ventilation control device comprising a processor and memory configured to:

store a target total exhaust volume that is a target total volume of exhaust to be discharged within a predetermined time;

store an exhaust capacity of each of the one of more ventilators connected to the ventilation control device;

acquire an already-discharged exhaust volume discharged from each of the one or more ventilators connected to the ventilation control device;

calculate a total already-discharged exhaust volume by adding up the already-discharged exhaust volumes of the one or more ventilators; and to, based on the calculated total already-discharged exhaust volume, the stored target total exhaust volume, a remaining time until an elapse of the predetermined time, and the stored exhaust capacity of each of the one or more ventilators, control each of the one or more ventilators connected to the ventilation control device to achieve exhaust in the target total exhaust volume within the remaining time, wherein the processor and the memory are configured to:

calculate a shortest exhaust time required for achieving the target total exhaust volume at the exhaust capacity;

calculate a total remaining exhaust volume that is a total exhaust volume required to reach the target total exhaust volume, based on the target total exhaust volume and the calculated total already-discharged exhaust volume at a timing at least the shortest exhaust time earlier than a time reaching the predetermined time, and set a turn-on time for each of the one or more ventilators connected to the ventilation control device, based on the calculated total remaining exhaust volume, the turn-on time being a time length in which the ventilator is operated, and wherein the processor calculates a control pattern for the one or more ventilators based on (i) the remaining time and (ii) an energy efficiency per unit time and an exhaust volume corresponding to the energy efficiency of each of the one or more ventilators, the control pattern achieving exhaust in the target total exhaust volume within the remaining time and maximizing the energy efficiency, and the processor controls at least one of the one or more ventilators connected to the ventilation control device, based on the calculated control pattern.

* * * * *